United States Patent
Nair (10) Patent No.: US 12,090,733 B2
(45) Date of Patent: Sep. 17, 2024

(54) LAMINATE OF MULTILAYER FILMS AND PROCESS THEREOF

(71) Applicant: EPL LIMITED, Mumbai (IN)

(72) Inventor: Hariharan Krishnan Nair, Mumbai (IN)

(73) Assignee: EPL LIMITED, Mumbai (IN)

( * ) Notice: Subject to any disclaimer, the term of this patent is extended or adjusted under 35 U.S.C. 154(b) by 0 days.

(21) Appl. No.: 17/588,053

(22) Filed: Jan. 28, 2022

(65) Prior Publication Data

US 2023/0027080 A1 Jan. 26, 2023

(30) Foreign Application Priority Data

Jul. 14, 2021 (IN) .............................. 202121031635

(51) Int. Cl.
*B32B 27/08* (2006.01)
*B32B 1/00* (2006.01)
(Continued)

(52) U.S. Cl.
CPC ................ *B32B 27/08* (2013.01); *B32B 1/00* (2013.01); *B32B 7/12* (2013.01); *B32B 27/306* (2013.01);
(Continued)

(58) Field of Classification Search
CPC . B32B 27/08; B32B 2439/66; B32B 2439/46; B32B 2307/732; B32B 2307/72; B32B 2307/714; B32B 2270/00; B32B 2255/205; B32B 225/10; B32B 2250/246; B32B 2250/05; B32B 27/32; B32B 27/308; B32B 27/306; B32B 7/12; B32B 1/02; B32B 1/00; B32B 37/153; B32B 2255/10;
(Continued)

(56) References Cited

U.S. PATENT DOCUMENTS 10,150,275 B2 12/2018 Shah et al.
2006/0222796 A1 10/2006 Morris
(Continued)

FOREIGN PATENT DOCUMENTS

| CA | 2016086314 | * | 6/2016 |
| WO | 2015/017697 A1 | | 2/2015 |
| WO | 2019/156733 A1 | | 8/2019 |

OTHER PUBLICATIONS

Examination Report issued for Indian Patent Application No. 202121031635, dated Oct. 13, 2022 in 5 pages.
(Continued)

*Primary Examiner* — James C Yager
(74) *Attorney, Agent, or Firm* — KNOBBE, MARTENS, OLSON & BEAR LLP (57) ABSTRACT

A laminate includes a multilayer outer film, which includes a first barrier layer and polyolefin layer on both sides of the first barrier layer, and a multilayer middle film, which includes a second barrier layer and polyolefin layer on both sides of the second barrier layer. The polyolefin layer of the multilayer outer film towards the multilayer middle film and/or the polyolefin layer of the multilayer middle film towards the multilayer outer film is metallized with a metal selected from aluminum, nickel, chromium, or combinations thereof. A process can be used for preparing the laminate and an article can include the laminate.

15 Claims, 1 Drawing Sheet

(51) Int. Cl.
  *B32B 7/12* (2006.01)
  *B32B 27/30* (2006.01)
  *B32B 27/32* (2006.01)
  *B32B 37/15* (2006.01)
  *B65D 65/40* (2006.01)

(52) U.S. Cl.
  CPC ............ *B32B 27/308* (2013.01); *B32B 27/32* (2013.01); *B32B 37/153* (2013.01); *B65D 65/40* (2013.01); *B32B 2250/05* (2013.01); *B32B 2250/246* (2013.01); *B32B 2255/10* (2013.01); *B32B 2255/205* (2013.01); *B32B 2270/00* (2013.01); *B32B 2307/714* (2013.01); *B32B 2307/72* (2013.01); *B32B 2307/732* (2013.01); *B32B 2439/46* (2013.01); *B32B 2439/66* (2013.01)

(58) Field of Classification Search
  CPC . B32B 2255/20; B32B 2307/748; B32B 1/08; B32B 7/02; B32B 2597/00; B32B 27/34; B32B 27/36; B32B 2250/24; B32B 2439/40; B65D 65/40
  See application file for complete search history.

(56) References Cited

U.S. PATENT DOCUMENTS

2012/0052225 A1\* 3/2012 Kani ...................... C08L 29/04
  428/36.6
2016/0086314 A1 3/2016 Xthona et al.
2017/0361582 A1\* 12/2017 Planeta ................. B32B 37/153
2018/0319143 A1\* 11/2018 Neagu .................... B32B 29/02

OTHER PUBLICATIONS

International Search Report issued for International Patent Application No. PCT/IN2022/050636, dated Sep. 16, 2022 in 3 pages.
Written Opinion issued for International Patent Application No. PCT/IN2022/050636, dated Sep. 16, 2022 in 6 pages.
Wolf, "A technology Decision—Adhesive Lamination or Extrusion Coating/Lamination?" TAPPI, 2010 Place Conference, Albuquerque, New Mexico; Apr. 2010.
Morris, "Multilayer Films from Resin and Process to End Use"; The Science and Technology of Flexible Packaging, Elsevier Inc. (2017).
Preliminary Examination Report issued in BR Application No. 102022009579-5, dated Jan. 9, 2024.

\* cited by examiner

LAMINATE OF MULTILAYER FILMS AND PROCESS THEREOF

CROSS-REFERENCE TO RELATED APPLICATION

This application claims priority to Indian Patent Application No. 202121031635 filed on Jul. 14, 2021, the disclosure of which including the specification, the drawings, and the claims is hereby incorporated by reference in its entirety.

FIELD OF INVENTION

The subject matter disclosed herein relates to the field of packaging materials and in particular, relates to chemically resistant laminate for use in the manufacturing of packaging materials.

BACKGROUND OF THE INVENTION

The packaging industry has emerged as one of the fastest growing sectors in the world economy. There are various packaging materials available in the market, such as glass, cardboard, paper, and metal, but plastic and polyethylene packaging material remain among the most commonly used material. Tubes are one of the well-established packaging formats used in any packing industry. The industry started with, aluminum tubes, then moved to aluminum barrier layer tubes (ABL), but over the years it has migrated to laminated plastic barrier layer tubes (PBL), due to its enhanced functionalities and for sustainability reasons.

Certain segments like cosmetics packaging, though are migrating from ABL to PBL for sustainability reason, the metallic luster has been in demand due to the aesthetics. To have a metallic feel and look, the metallization on polymeric film has been utilized. However, the metallic interface is the weakest aspect of the laminate since there is weak bonding at the metallic interface, especially when you have aggressive products which can penetrate and delaminate at the metallic interface.

US20060222796A1 discloses a multilayer structure comprising a metallized film, an ethylene/alkyl acrylate copolymers composition as an extrusion layer to improve the adhesion to the metal film. U.S. Ser. No. 10/150,275B2 discloses a multilayer structure comprising a skin layer of an ethylene/olefin copolymer to improve the adhesion of metallization to the skin layer. Though there have been attempts to improve the adhesion strength at the metallized interface, there has been a challenge to retain the adhesion especially when the filled products inside can be aggressive and migrate to delaminate the metallic interface.

SUMMARY OF THE INVENTION

In a first aspect of the present disclosure, there is provided a laminate comprising: a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof.

In a second aspect of the present disclosure, there is provided a process for preparing the laminate comprising: a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof, the process comprising: extrusion lamination of the multilayer outer film and the multilayer middle film; and optionally, further laminating with a sealant film.

In a third aspect of the present disclosure, there is provided an article comprising the laminate comprising: a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof.

These and other features, aspects, and advantages of the present subject matter will be better understood with reference to the following description. This summary is provided to introduce a selection of concepts in a simplified form. This summary is not intended to identify key features or essential features of the claimed subject matter.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "at least one" used herein refers to one or more and thus, includes individual components as well as mixtures/combinations.

The term "laminate" used herein refers to a wall between the packaged product and the surrounding environment comprising at least two films. The laminate may be molded to various shaped articles, such as packaging tubes, cans, containers, or rolled bodies for the packaging of products/materials. In the present disclosure, the laminate is highly chemical resistant such that when in contact with aggressive chemicals or the environment, the laminate is stable and does not degrade or delaminate.

The phrase "polyolefin" refers to a polymer of olefin may be polyethylene having a density in the range 0.910 to 0.965 g/cm$^3$. The term polyolefin as used herein refers to any polyethylene having density in the range of 0.910 to 0.965 g/cm$^3$, wherein the polyethylene may include high density polyethylene, medium density polyethylene, low density polyethylene, linear low-density polyethylene, modified polyethylene(s), such as metal-modified polyethylene, chemically modified polyethylene, and the like.

The phrases "high-density polyethylene", "medium-density polyethylene", "low-density polyethylene", and "linear low-density polyethylene" as used herein refer to polyethylene having densities well known to the person skilled in the art.

The term "multilayer outer film" refers to a film comprising multiple layers of polyolefin and a first barrier layer, with polyolefin on either side of the first barrier layer. The first barrier layer is sandwiched by the polyolefin layers in the presence of a tie layer. And these multilayer form the outer film of the laminate.

The term "multilayer middle film" refers to a film comprising multiple layers of polyolefin and a second barrier layer, with polyolefin on either side of the second barrier layer, which forms the middle film of the laminate. In the multilayer middle film, the polyolefin layers are sandwiched with the second barrier layer in the presence of a tie layer. The middle film itself may act as the product contact layer.

The term "first barrier layer" and "second barrier layer" refer to layer providing barrier properties to the film or the laminate. The first barrier layer and the second barrier layer comprise a member independently selected from ethylene vinyl alcohol, polyamides, polyvinyl alcohol, ceramic coatings, polyethylene terephthalate, or combinations thereof.

The first barrier layer and the second barrier layer may comprise same member or different member selected from ethylene vinyl alcohol, polyamides, polyvinyl alcohol, ceramic coatings, polyethylene terephthalate, or combinations thereof. The first barrier layer and the second barrier layer of the present disclosure provides dual barrier property to the laminate thereby providing improved chemical resistance to the laminate, especially at the metallized interface The term "extrusion layer" refers to a layer of polymer of ethylene or copolymer of polyethylene comprising ethylene with acrylic acid or maleic anhydride.

The term "tie layer" refers to a layer which binds any two layers having dissimilar polarity in a film. In the present disclosure, the tie layer binds polyolefin layer with barrier layer and the tie layer comprises polymeric adhesive selected from the group consisting of maleated polyethylene, anhydride grafted ethylene/1-butene copolymer, anhydride grafted ethylene/1-hexene copolymer, anhydride grafted polypropylene, anhydride grafted propylene ethylene copolymer, ethylene vinyl acetate copolymer, ethylene methyl acrylate copolymer, anhydride grafted ethylene/1-octene copolymer, and combinations thereof.

The term "sealant film" used herein refers to a multilayer polyolefin. The polyolefin can be polyethylene. In an embodiment, the sealant film is laminated to the middle film and is generally the innermost layer of packaging and will be the product contact layer.

The term "an article" used herein refers to any packaging material made from the laminate of the present disclosure which includes but not limited to packaging pouch, packaging tube, cans, containers, rolled bodies, laminated tubes widely used for packaging chemicals, cosmetic material, toothpaste, and other viscous food products.

The term "lamination" used herein refers to a process in which two or more films are joined together by an extrusion layer extruded in film shape and/or adhesive lamination. The extrusion layer thus acts as a bonding agent.

The term "tandem lamination" used herein refers to a process in which two or more films are joined together in the presence of a bonding material using a tandem laminator. The films per se could be multilayer film produced through blown film process or cast film process.

The term "metallized" refers to metal incorporation in the specific layer of the laminate. Metallized-PE refers to metallization of the polyolefin layer of multilayer middle film which is towards the multilayer outer film. PE-metallized refers to metallization of polyolefin layer of the multilayer outer film which is towards the multilayer middle film. Metallized is carried out by chemical or physical vapor deposition of the metals on the polyethylene layer. The metallized-PE or PE-metallized provides the laminate the lustrous appearance which is significant for commercial purpose of the laminate.

The term "ILBS" refers to Inter Layer Bond Strength as per ASTM F 904-16 This test measures the bond strength (or) ply adhesion of laminates made from flexible materials such as cellulose, paper, plastic film, and foil. This includes laminates made by various processes: adhesive laminates, extrusion coatings, extrusion laminates, and coextrusion. The ILBS value of metallized surface with its adjacent layer (namely PE layer) through an acid copolymer is measured to reflect the improvement of the invention.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range of 50 µm to 200 µm should be interpreted to include not only the explicitly recited limits of 50 µm to 200 µm, but also to include sub-ranges, such as 65 µm to 150 µm, 70 µm to 200 µm, and so forth, as well as individual amounts, including fractional amounts, within the specified ranges, such as 65.2 µm, 140.6 µm, and 161.3 µm, for example.

As discussed in the background, there have been various efforts in the recent past to design a laminate or a packaging material to withstand harsh environmental conditions. There have been reports in which the barrier effect had been increased either by inclusion of multiple barrier layers or by increasing thickness of the barrier layer to improve the barrier property of the laminate, however, that resulted in the increased thickness of the laminate, as against the desired thickness of the laminate or the packaging material. Hence it is essential to maintain the thickness at the same time improve the barrier property of the laminate. Also, the metallic appearance is a significantly important aspect of these laminates from the commercial point of view and hence there is a need for a laminate that provides a perfect balance of all the parameters mentioned above. It is therefore an object of the invention to provide a laminate with an improved metallized layer adhesion in spite of aggressive product that is filled inside. This objective is achieved by protecting the metallized interface with high barrier layers to provide laminate with higher chemical resistance. Accordingly, the present disclosure provides a laminate with multilayer outer film, a multilayer middle film, and an optional multilayered sealant film. The multilayered outer film comprises a first barrier layer sandwiched by polyethylene layers with optional metallization of the polyethylene layer facing the middle film. The multilayered middle film comprises a second barrier layer sandwiched by polyethylene layers with optional metallization of the polyethylene layer facing the outer film. The thickness of the first barrier layer in the outer film and the thickness of the second barrier layer in the middle film is designed in such a way, it possesses high barrier properties on the inside as well as on the outside without an increase in the thickness of the laminate. The barrier layer and the polyethylene layers are held together by a tie layer. And the outer film and the middle film are laminated through an extrusion layer. The sealant film comprising multiple layers of polyethylene is tandem laminated with outer and middle film. Thus, the presence of a barrier layer in the outer film and middle film provides dual barrier property and the laminate exhibits high chemical resistance protecting the metallized interface. Metallization of polyethylene either in the outer film or in the middle film helps in preserving the gleaming look of the laminate. The metallic interface is protected on either side by the barrier layer.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

In an embodiment of the present disclosure, there is provided a laminate comprising: a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof.

In an embodiment of the present disclosure, there is provided a laminate comprising: a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of the multilayer outer film towards the multilayer middle film, (or) the polyolefin layer of multilayer middle film towards the multilayer outer film, (or) the polyolefin layer of the multilayer outer film towards the multilayer middle film and the polyolefin layer of multilayer middle film towards the multilayer outer film, is metallized with a metal selected from aluminum, nickel, chromium, or combinations thereof.

In an embodiment of the present disclosure, there is provided a laminate comprising: a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of the multilayer outer film towards the multilayer middle film is metallized with a metal selected from aluminum, nickel, chromium, or combinations thereof.

In an embodiment of the present disclosure, there is provided a laminate comprising: a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of multilayer middle film towards the multilayer outer film is metallized with a metal selected from aluminum, nickel, chromium, or combinations thereof.

In an embodiment of the present disclosure, there is provided a laminate comprising: a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of the multilayer outer film towards the multilayer middle film and the polyolefin layer of multilayer middle film towards the multilayer outer film is metallized with a metal selected from aluminum, nickel, chromium, or combinations thereof In an embodiment of the present disclosure, there is provided a laminate as disclosed herein, wherein the metallization may be done by using any appropriate techniques. In some embodiments, polymeric films may be pretreated, such as by corona treatment (or) plasma treatment and additionally treating with metal adhesion enhance such as primer, prior to metallization. Metallization may be performed by a physical vapor deposition process in which the metal is evaporated under vacuum. The metal then condenses on the polymeric layer. Metallization may be carried out by chemical vapor deposition method.

In an embodiment of the present disclosure, there is provided a laminate as disclosed herein, wherein the laminate comprises a sealant film and the sealant film is a multilayer having 3-7 layers and thickness in a range of 40-150 µm.

In an embodiment of the present disclosure, there is provided a laminate comprising: i) a multilayer outer film comprising a first barrier layer and polyolefin layer on both sides of the first barrier layer; ii) a multilayer middle film comprising a second barrier layer and polyolefin layer on both sides of the second barrier layer, and iii) a sealant film of multilayer having 3-7 layers and thickness in a range of 40-150 µm, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof.

In an embodiment of the present disclosure, there is provided a laminate as disclosed herein, wherein the outer film, and the middle film are attached through an extrusion layer comprising polyolefin and/or a polyolefin copolymer; and the copolymer is selected from ethylene-acrylic acid polymer, maleic anhydride-grafted-polyethylene, or combinations thereof. In another embodiment of the present disclosure, wherein the extrusion layer is a monolayer of polyethylene blended with maleic anhydride-grafted-polyethylene or a coextruded layer of ethylene-acrylic acid copolymer and polyethylene.

In an embodiment of the present disclosure, there is provided a laminate as disclosed herein, wherein the outer film, the middle film, and the sealant film are attached through an extrusion layer comprising polyolefin and/or a polyolefin copolymer; and the copolymer is selected from ethylene-acrylic acid polymer, maleic anhydride-grafted-polyethylene, or combinations thereof.

In an embodiment of the present disclosure, there is provided a laminate as disclosed herein, wherein the outer film, the middle film, and the sealant film are attached through an extrusion layer, wherein the extrusion layer is a monolayer of polyethylene blended with maleic anhydride-grafted-polyethylene or a coextruded layer of ethylene-acrylic acid copolymer and polyethylene.

In an embodiment of the present disclosure, there is provided a laminate as disclosed herein, wherein the polyolefin layer comprises a polymer having density in the range of 0.910 g/cm$^3$-0.965 g/cm$^3$ and is selected from high density polyethylene (HDPE), medium density polyethylene (MDPE), low density polyethylene (LDPE), linear low-density polyethylene (LLDPE), or combinations thereof.

In an embodiment of the present disclosure, there is provided a laminate as disclosed herein, wherein the first barrier layer and the second barrier layer independently comprise a member selected from ethylene vinyl alcohol, polyamides, polyvinyl alcohol, ceramic coatings, polyethylene terephthalate, or combinations thereof. In another embodiment of the present disclosure, the first barrier layer and the second barrier layer is independently ethylene vinyl alcohol.

In an embodiment of the present disclosure, there is provided a laminate as disclosed herein, wherein the outer film, and the middle film further comprises one or more tie layer comprising polymeric adhesive selected from a group consisting of maleated polyethylene, anhydride grafted (ethylene/1-butene copolymer, anhydride grafted ethylene/1-hexene copolymer, anhydride grafted polypropylene, anhydride grafted propylene ethylene copolymer), ethylene vinyl acetate copolymer, ethylene methyl acrylate copolymer, anhydride grafted ethylene/1-octene copolymer, and combinations thereof.

In an embodiment of the present disclosure, there is provided a laminate as disclosed herein, wherein the outer film has thickness in a range of 50 to 200 µm; and the middle film has thickness in a range of 50 to 200 µm.

In an embodiment of the present disclosure, there is provided a laminate as disclosed herein, wherein the first barrier layer thickness in the outer film to the second barrier layer thickness in the middle film is in the ratio range of 4:1 to 1:4. In another embodiment of the present disclosure, the first barrier layer thickness in the outer film to the second barrier layer thickness in the middle film is in the ratio range of 3:2 to 1:4. In yet another embodiment of the present disclosure, the first barrier layer thickness in the outer film to the second barrier layer thickness in the middle film is in the ratio range of 1:2 to 1:3.

In an embodiment of the present disclosure, there is provided a laminate as disclosed herein, wherein the first barrier layer thickness in the outer film is in a range of 1-15 µm and the second barrier layer thickness in the middle film is in a range of 1-15 µm.

In an embodiment of the present disclosure, there is provided a laminate as disclosed herein, wherein thickness of the first barrier layer in the outer film is 4 µm and the thickness of the second barrier layer in the middle film is 11 µm.

In an embodiment of the present disclosure, there is provided a laminate as disclosed herein, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof by physical vapor deposition or chemical vapor deposition.

In an embodiment of the present disclosure, there is provided a laminate as disclosed herein, wherein the laminate is chemically resistant with ILBS in the range of 0.25 kgf/15 mm to 2.0 kgf/15 mm. In another embodiment of the present disclosure, wherein the laminate is chemically resistant with ILBS in the range of 0.5 kgf/15 mm to 1.5 kgf/15 mm. In yet another embodiment of the present disclosure, wherein the laminate is chemically resistant with ILBS in the range of 0.8 kgf/15 mm to 1.2 kgf/15 mm.

In an embodiment of the present disclosure, there is provided a process for preparing the laminate comprising: i) a multilayer outer film comprising a first barrier layer and polyolefin layer on both sides of the first barrier layer; and ii) a multilayer middle film comprising a second barrier layer and polyolefin layer on both sides of the second barrier layer, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof, the process comprising: a) extrusion lamination of the multilayer outer film and the multilayer middle film; and b) optionally, further laminating with a sealant film to obtain the laminate.

In an embodiment of the present disclosure, there is provided a process for preparing the laminate comprising: i) a multilayer outer film comprising a first barrier layer and polyolefin layer on both sides of the first barrier layer; ii) a multilayer middle film comprising a second barrier layer and polyolefin layer on both sides of the second barrier layer, and iii) a sealant film of multilayer having 3-7 layers and thickness in a range of 40-150 µm, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof, the process comprising: a) extrusion lamination of the multilayer outer film and the multilayer middle film; and b) subsequently laminating a sealant film to multilayer middle film to obtain the laminate.

In an embodiment of the present disclosure, there is provided a process for preparing the laminate as disclosed herein, the process comprising: a) extrusion lamination of the multilayer outer film and the multilayer middle film; and b) laminating with a sealant film to obtain the laminate, wherein the polyolefin layer of the multilayer outer film towards the multilayer middle film and/or the polyolefin layer of multilayer middle film towards the multilayer outer film, is metallized with a metal selected from aluminum, nickel, chromium, or combinations thereof prior to extrusion lamination.

In an embodiment of the present disclosure, there is provided a process for preparing the laminate comprising: i) a multilayer outer film comprising a first barrier layer and polyolefin layer on both sides of the first barrier layer; and ii) a multilayer middle film comprising a second barrier layer and polyolefin layer on both sides of the second barrier layer, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof, the process comprising: extrusion lamination of the multilayer outer film and the multilayer middle film to obtain the laminate.

In an embodiment of the present disclosure, there is provided a process for preparing the laminate as disclosed herein, the process comprising: a) extrusion lamination of the multilayer outer film and the multilayer middle film; and b) optionally, further tandem laminating with a sealant film to obtain the laminate.

In an embodiment of the present disclosure, there is provided a process for preparing the laminate as disclosed herein, wherein the outer film is obtained by sandwiching a first barrier layer between polyolefin layers in presence of a tie layer; and the polyolefin layer of the outer film towards the middle film is metallized with a metal selected from aluminum, nickel, chromium, or combinations thereof.

In an embodiment of the present disclosure, there is provided a process for preparing the laminate as disclosed herein, wherein the middle film is obtained by sandwiching a second barrier layer between polyolefin layers in presence of a tie layer and the polyolefin layer of the middle film towards the outer film is metallized with a metal selected from aluminum, nickel, chromium, or combinations thereof.

In an embodiment of the present disclosure, there is provided a process for preparing the laminate as disclosed herein, the process comprising: a) extrusion lamination of the multilayer outer film and the multilayer middle film, wherein the polyolefin layer of the multilayer outer film towards the multilayer middle film is metallized with a metal selected from aluminum, nickel, chromium, or combinations thereof; and b) optionally, further laminating with a sealant film to obtain the laminate.

In an embodiment of the present disclosure, there is provided a process for preparing the laminate as disclosed herein, the process comprising: a) extrusion lamination of the multilayer outer film and the multilayer middle film, wherein the polyolefin layer of multilayer middle film towards the multilayer outer film is metallized with a metal selected from aluminum, nickel, chromium, or combinations thereof; and b) optionally, further laminating with a sealant film to obtain the laminate.

In an embodiment of the present disclosure, there is provided a process for preparing the laminate as disclosed herein, the process comprising: a) extrusion lamination of the multilayer outer film and the multilayer middle film, wherein the polyolefin layer of the multilayer outer film towards the multilayer middle film and the polyolefin layer of multilayer middle film towards the multilayer outer film is metallized with a metal selected from aluminum, nickel, chromium, or combinations thereof; and b) optionally, further laminating with a sealant film to obtain the laminate.

In an embodiment of the present disclosure, there is provided an article comprising the laminate comprising a) a multilayer outer film comprising a first barrier layer and polyolefin layer on both sides of the first barrier layer; and b) a multilayer middle film comprising a second barrier layer and polyolefin layer on both sides of the second barrier layer, wherein the polyolefin layer of the multilayer outer film towards the multilayer middle film and/or the polyolefin layer of multilayer middle film towards the multilayer outer film is metallized with a metal selected from aluminum, nickel, chromium, or combinations thereof.

In an embodiment of the present disclosure, there is provided an article comprising the laminate as disclosed herein, wherein the article is selected from packaging pouch, packaging tube, cans, containers, or rolled bodies.

Although the subject matter has been described in considerable detail with reference to certain embodiments thereof, other embodiments are possible. As such, the spirit and scope of the disclosure should not be limited to the description of the embodiments contained herein.

EXAMPLES

The disclosure will now be illustrated with the working examples, which is intended to illustrate the working of disclosure and not intended to take restrictively to imply any limitations on the scope of the present disclosure. Unless defined otherwise, all technical and scientific terms used herein have the same meaning as commonly understood to one ordinary person skilled in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Abbreviations

EVOH: Ethylene vinyl alcohol
ACP: Ethylene Acrylic acid polymer
MAH-PE: Maleic anhydride grafted polyethylene
PE: Polyethylene
LD or LDPE: Low density polyethylene
LLD or LLDPE: Linear low density polyethylene
HD or HDPE: High density polyethylene
MD or MDPE: Medium density polyethylene Materials and Methods For the purpose of the present disclosure, the following materials of specific make were used to prepare the multilayer laminate. EVOH from EVAL™ F101B, EVAL™

F171B, SoarnoL™ DC3203RB, ACP: Ethylene Acrylic acid polymer from Nucrel™ 30707, Escor™ 6000, PRIMACOR™ 3003, MAH-PE from Bynel™ 41E710, BONDYRAM® 4108, BONDYRAM® TL4110, and PE from Dowlex, Elite, Enable, Exceed, Relene, Borstar which are blown film and extrusion grades.

Example 1

Laminate of the Present Disclosure

The laminate of the present disclosure comprises multilayer outer film and multilayer middle film and optionally the sealant film. The multilayer outer film comprises a first barrier layer and polyethylene layers on both sides of the first barrier layer. The first barrier layer and polyethylene layers are held together by a tie layer. The first barrier layer is EVOH and the tie layer used is a polymeric adhesive selected from maleated polyethylene, anhydride grafted ethylene/1-butene copolymer, anhydride grafted ethylene/1-hexene copolymer, polypropylene, propylene ethylene copolymer, ethylene vinyl acetate copolymer, ethylene methyl acrylate copolymer, or anhydride grafted ethylene/1-octene copolymer. The thickness of the first barrier layer is 4 µm. The polyethylene layer which is facing the middle film is metallized with a metal selected from aluminum, nickel, chromium, or combinations thereof. Thus the structure of outer film is polyethylene/tie/EVOH (4 µm)/tie/metallized polyethylene or polyethylene/tie/EVOH (4 µm)/tie/polyethylene.

Similarly, the middle film comprises a second barrier layer with higher thickness of EVOH layer than first barrier layer in the outer film. The thickness of EVOH in the middle film is 11 µm. This way the total thickness of the barrier layers are maintained so that the overall thickness of the laminate did not increase. And, the presence of EVOH in the outer film and in the middle film provides high barrier property to the laminate. The polyethylene layer facing the outer film is optionally metallized with a metal selected from aluminum, nickel, chromium, or combinations thereof. Thus, the structure of the middle film is polyethylene/tie/EVOH (11 µm)/tie/polyethylene or metallized polyethylene/tie/EVOH (11 µm)/tie/polyethylene The sealant film is a multilayer film which comprises 3 to 7 layers of polyethylene. The sealant film is optionally present in the laminate.

The outer film and the middle film are laminated by an extrusion layer. And the extrusion layer (EL) is ethylene acrylic acid copolymer (ACP) or maleic anhydride grafted polyethylene (MAHPE). The extrusion layer (EL) used is ethylene acrylic acid copolymer (ACP), or LD, the tie layer (tie) is maleic anhydride-grafted LLDPE with a thickness of 5 µm and metallized-PE or PE-metallized is obtained by vapor deposition of aluminum on the polyethylene.

The structure of the laminate of the present disclosure is multilayer outer film/multilayer middle film/sealant film. The laminate is represented as a. (75µ)PE-(LD30%+LLD70%)/tie/EVOH(4 µm)/tie/PE (LD30%+LLD70%)—metallized//(25µ)EL//(110µ)PE-(MD80%+LD20%)/tie/EVOH(11 µm)/tie/PE (MD80%+LD20%).

b. (75µ)PE(LD30%+LLD70%)/tie/EVOH(4 µm)/tie/PE (LD30%+LLD70%)//(25µ)EL//(110µ)(MD80%+LD20%)PE-metallized/tie/EVOH (11 µm)/tie/PE (MD80%+LD20%).

c. (75µ)PE(LD30%+LLD70%)/tie/EVOH (4 µm)/tie/ (LD30%+LLD70%) PE-metallized//(25µ) EL//(75µ) metallized PE (MD80%+LD20%)/tie/EVOH(11 µm)/tie/PE(MD80%+LD20%).

d. (75µ)(LD30%+LLD70%)PE/tie/EVOH(4 µm)/tie/ (LD30%+LLD70%) PE-metallized//(25µ)EL//(75µ) (MD80%+LD20%)PE/tie/EVOH(11 µm)/tie/ (MD80%+LD20%)PE//(50µ) PE(MD60%+LLD40%)

e. (75µ)PE(LD30%+LLD70%)/tie/EVOH(4 µm)/tie/ (LD30%+LLD70%) PE//(25µ) EL//(75µ)(LD30%+LLD70%)PE-metallized/tie/EVOH (11 µm)/tie/ (MD80%+LD20%)PE//(50µ)PE (MD60%+LLD40%)

f. (75µ)(LD30%+LLD70%)PE/tie/EVOH (4 µm)/tie/ (LD30%+LLD70%) PE-metallized//(25µ)EL//(75µ) metallized (MD80%+LD20%)PE/tie/EVOH(11 µm)/tie/(MD80%+LD20%)PE//(50µ) PE(MD60%+LLD40%).

Figure 1:
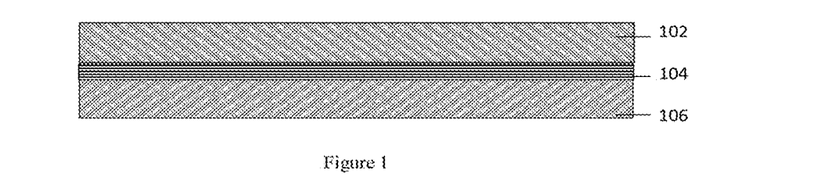
FIG. 1 illustrates the cross section of the overall laminate of the present disclosure with outer film, middle film and an extrusion layer, in accordance with an implementation of the present disclosure.
Figure 2:
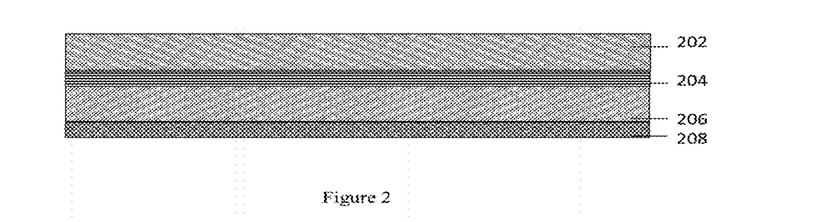
FIG. 2 illustrates the cross section of the overall laminate of the present disclosure with outer film, middle film, an extrusion layer and a sealant film, in accordance with an implementation of the present disclosure.

FIG. 1 illustrates the cross section of the overall laminate of the present disclosure with multilayered outer film (102), the multilayered middle film (106) and the extrusion layer (104). FIG. 2 illustrates the cross section of the overall laminate of the present disclosure with multilayered outer film (202), the extrusion layer (204), the multilayered middle film (206), and the multilayered polyethylene sealant film (208).

Figure 3:
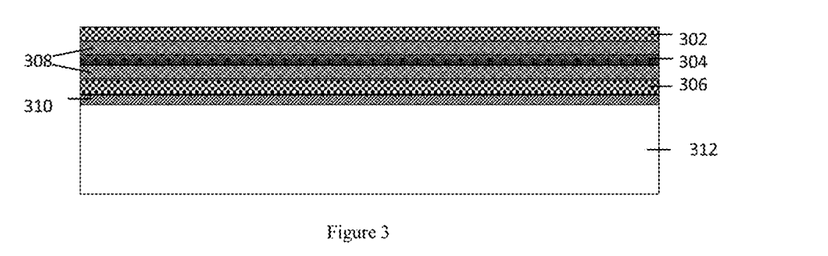
FIG. 3 illustrates the layered structure of the laminate of the present disclosure depicting the multilayered outer film, in accordance with an implementation of the present disclosure.

FIG. 3 illustrates the laminate of the present disclosure depicting the multilayered outer film with the polyethylene layer (302) on outer side, EVOH first barrier layer (304) and another polyethylene layer (306) on the inner side of the outer film facing the middle film, which may be optionally metallized. The polyethylene and barrier layer are bonded via the tie layer (308). FIG. 3 also depicts the extrusion layer (310) and the middle film (312).

Figure 4:
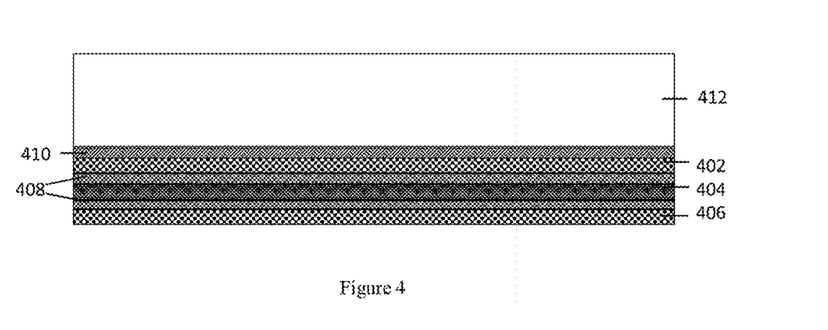
FIG. 4 illustrates the layered structure of the laminate of the present disclosure depicting the multilayered middle film, in accordance with an implementation of the present disclosure.

FIG. 4 illustrates the laminate of the present disclosure depicting the multilayered middle film with the polyethylene layer (402) on outer side facing the outer film which may be optionally metallized, EVOH second barrier layer (404) and another polyethylene layer (406) on the inner side of the middle film. The polyethylene and barrier layer are bonded via the tie layer (408). FIG. 4 also depicts the extrusion layer (410) and the outer film (412).

Example 2

Process of Preparing the Laminate of the Present Disclosure

Multilayer outer film is prepared by sandwiching polyethylene with EVOH in the presence of a tie layer. And optionally the polyethylene in the outer film is metallized as per the laminate structure provided in Example 1. The middle film is obtained by sandwiching the polyethylene with EVOH using the tie layer. And optionally the polyethylene in the middle film is metallized as per the laminate structure provided in Example 1.

The multilayer outer film or the multilayer middle film of the present disclosure can be prepared by blown film extrusion, wherein all the layers are prepared by blown film extrusion and then are extrusion laminated to form the multilayer outer film or the multilayer middle film. The process of film extrusion is a well-known process as discussed in the reference: The Science and Technology of Flexible Packaging: Multilayer Films from Resin and Process to End Use, Barry A. Morris, Elsevier Inc, (2017), 28-37.

The multilayer outer film or the multilayer middle film of the present disclosure can also be made by a cast film process well known in the art. More detailed information regarding the cast film process can be extracted from the following reference: The Science and Technology of Flexible Packaging: Multilayer Films from Resin and Process to End Use, Barry A. Morris, Elsevier Inc, (2017), 28-37.

The outer film and the middle film are laminated through the extrusion layer and the laminate is obtained. The extrusion layer is a monolayer of maleic anhydride grafted polyethylene or coextruded acrylic acid polyethylene.

In another example, the outer film and middle film is laminated by an extrusion layer and a modified bi-film laminate is obtained. The modified bi-film is subjected to tandem lamination with sealant film to obtain the final laminate. More details regarding the lamination process are present in Wolf R. "A technology decision-adhesive lamination or extrusion coating/lamination?" In: Tappi place Conference, April Albuquerque (N. Mex.); 2010. viewed on 26 May 2020, (https://imisrise.tappi.org/TAPPI/Products/10/PLA/10PLA57.aspx).

Example 3

The laminate of the present disclosure is used in preparing packaging pouches or tubes. The present disclosure provides a packaging pouch for the packaging of products including harsh chemicals. The packaging pouch was tested to identify the resistant properties towards heat, harsh chemicals, and the environment. For this purpose, the packaging pouch of the present disclosure was subjected to chemical resistance testing.

Resistance Properties of the Laminate

For the chemical resistance test, the product was filled in the pouch made from the laminate of the present disclosure. The same product was smeared over the pouches and kept in an oven at 45° C. for 3 days. At the end of $3^{rd}$ day, the Inter layer bond strength of the laminated layers was tested.

TABLE 1

Comparative Example

| Interface | Standard | ILBS Value (kgf/15 mm) |
|---|---|---|
| (LD30% + LLD70%)/PE-(LD30% + LLD70%)/PE-(LD30% + LLD70%)/PE-Metallized/ACP | ASTM F 904-16 | Delamination occurs at ACP interface |
| ACP/Barrier Film* | | Could not be separated (CNS) |
| Barrier Film*/LD | | (CNS) |
| LD/(MD60% + LLD40%) PE | | (CNS) |

*((MD80% + LD20%)/PE-Tie-EVOH-Tie-(MD80% + LD20%)/PE)

TABLE 2

Laminate of the present disclosure

| Interface | Standard | ILBS Value (kgf/15 mm) |
|---|---|---|
| PE-Tie-EVOH-Tie-PE-Metallized/ACP (75μ) PE-LD30% + LLD70%/tie/EVOH (4 μm)/tie/PE LD30% + LLD70% metallized//(25) EL) | ASTMF 904-16 | 1.13 |

TABLE 2-continued

Laminate of the present disclosure

| Interface | Standard | ILBS Value (kgf/15 mm) |
|---|---|---|
| ACP/Barrier Film* ((25μ) ACP//(110μ) PE-MD80% + LD20%/tie/EVOH (11 μm)/tie/PE MD80% + LD20%) | | Could not be separated (CNS) |
| Barrier Film*/LD ((110μ) PE-MD80% + LD20%/tie/EVOH (11 μm)/tie/PE MD80% + LD20%)/LD) | | (CNS) |
| LD/(MD60% + LLD40%) PE | | 1.11 |

*(PE-Tie-EVOH-Tie-PE) Tie layer is maleic anhydride-grafted-LLDPE with a thickness of 5 μm.
LD refers to LDPE.

As can be seen from Tables 1 and 2 (comparative example and laminate of the present disclosure), the chemical resistance has improved at the metallic interface due to the flanking of metallized PE layer by EVOH layers. Specifically, from Table 1 it can be observed that in the absence of EVOH in the outer film, the delamination occurs at the ACP interface (extrusion layer). Similarly, the other prepared laminates (b to f) of the present disclosure showed improved chemical resistance due to the flanking of the metallized PE layer with EVOH layers. These results confirmed surprising effect in terms of chemical resistance and increased bond strength of the laminates of the present disclosure. Also, the laminate of the present disclosure provided a metallic appearance which is an essential feature for the commercial aspect.

Advantages of the Present Disclosure

The above-mentioned implementation examples as described on this subject matter and its equivalent thereof have many advantages, including those which are described.

The present disclosure provides a laminate comprising a multilayer outer film, multilayer middle film and optionally a sealant film. The multilayer outer film and the middle film comprises polyethylene with barrier layer sandwiched by a tie layer. The polyethylene in the outer film facing the middle film and or the polyethylene in the middle film facing the outer film is metallized. The thickness of the first barrier layer in the outer film to the thickness of the second barrier layer in the middle film is in the ratio range of 4:1 to 1:4. The barrier layers are present in the outer film and in the middle film, thus the dual barrier layer provides high barrier property to the laminate. And the thickness of the barrier layers are maintained such that the overall thickness of the laminate does not increase and the laminate structure is maintained intact. The outer film and the middle film is extruded through the extrusion layer. The extrusion layer and the polyethylene layers sandwiched to the barrier layer provides protected interface of the barrier layer. The present disclosure also provides a convenient process for preparing the laminate. The laminate of the present disclosure is highly sustainable in all environments and can be used for packaging of aggressive, harsh chemicals. The laminate does not degrade or delaminate when exposed to harsh environment. The dual barrier layer in the laminate provides high barrier effect and provides good chemical resistance to the laminate and the articles made from the laminate.

What is claimed is:

1. A laminate comprising:
   a. a multilayer outer film comprising a first barrier layer and polyolefin layer on both sides of the first barrier layer; and
   b. a multilayer middle film comprising a second barrier layer and polyolefin layer on both sides of the second barrier layer,
   wherein the polyolefin layer of the multilayer outer film towards the multilayer middle film and/or the polyolefin layer of the multilayer middle film towards the multilayer outer film is metallized with a metal selected from aluminum, nickel, chromium, or combinations thereof,
   wherein the first barrier layer and the second barrier layer independently consist of a material selected from ethylene vinyl alcohol, polyamides, polyvinyl alcohol, polyethylene terephthalate, or combinations thereof, and
   wherein the laminate is chemically resistant with ILBS in the range of 0.25 kgf/15 mm to 2.0 kgf/15 mm.

2. The laminate as claimed in claim 1, wherein the laminate further comprises a sealant film; and the sealant film is multilayer having 3-7 layers and thickness in the range of 40-150 μm.

3. The laminate as claimed in claim 2, wherein the outer film, the middle film, and the sealant film are attached through an extrusion layer comprising polyolefin and/or a polyolefin copolymer; and the copolymer is selected from ethylene-acrylic acid polymer, maleic anhydride-grafted-polyethylene, or combinations thereof.

4. The laminate as claimed in claim 1, wherein the polyolefin layer comprises polymer having density in the range of 0.910 g/cm³-0.965 g/cm³ is selected from high density polyethylene, medium density polyethylene, low density polyethylene, linear low-density polyethylene, or combinations thereof.

5. The laminate as claimed in claim 1, wherein the outer film, and the middle film further comprises one or more tie layer comprising polymeric adhesive selected from the group consisting of maleated polyethylene, anhydride grafted ethylene/1-butene copolymer, anhydride grafted (ethylene/1-hexene copolymer, polypropylene, propylene ethylene copolymer), ethylene vinyl acetate copolymer, ethylene methyl acrylate copolymer, anhydride grafted ethylene/1-octene copolymer, and combinations thereof.

6. The laminate as claimed in claim 1, wherein the outer film has thickness in a range of 50 to 200 μm; and the middle film has thickness in a range of 50 to 200 μm.

7. The laminate as claimed in claim 1, wherein the first barrier layer thickness in the outer film to the second barrier layer thickness in the middle film is in a ratio range of 4:1 to 1:4.

8. The laminate as claimed in claim 1, wherein the outer film or the middle film is metallized by physical vapor deposition, or chemical vapor deposition.

9. A process for preparing the laminate as claimed in claim 1, the process comprising extrusion lamination of the multilayer outer film and the multilayer middle film.

10. The process as claimed in claim 9, wherein the lamination is carried out by tandem lamination.

11. The process as claimed in claim 9, wherein the outer film is obtained by sandwiching a first barrier layer between polyolefin layers in presence of a tie layer; and the polyolefin layer of the outer film towards the middle film is metallized with a metal selected from aluminum, nickel, chromium, or combinations thereof.

12. The process as claimed in claim 9, wherein the middle film is obtained by sandwiching a second barrier layer between polyolefin layers in presence of a tie layer, and the polyolefin layer of the middle film towards the outer film is metallized with a metal selected from aluminum, nickel, chromium, or combinations thereof.

13. An article comprising the laminate as claimed in claim 1.

14. The article as claimed in claim 13, wherein the article is selected from packaging pouch, packaging tube, cans, containers, or rolled bodies.

15. The process as claimed in claim 9, further comprising laminating with a sealant film to obtain the laminate.

* * * * *